US010817154B2

(12) United States Patent
Jiang et al.

(10) Patent No.: US 10,817,154 B2
(45) Date of Patent: Oct. 27, 2020

(54) SYSTEM AND METHOD FOR PROCESSING SCREENSHOT-TYPE NOTE OF STREAMING DOCUMENT

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Tienan Jiang, Beijing (CN); Qing Luo, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Bejing (CN)

( * ) Notice: Subject to any disclaimer, the term of this patent is extended or adjusted under 35 U.S.C. 154(b) by 63 days.

(21) Appl. No.: 16/300,964

(22) PCT Filed: Apr. 12, 2017

(86) PCT No.: PCT/CN2017/080184
§ 371 (c)(1),
(2) Date: Dec. 11, 2018

(87) PCT Pub. No.: WO2017/193754
PCT Pub. Date: Nov. 16, 2017

(65) Prior Publication Data
US 2019/0163351 A1 May 30, 2019

(30) Foreign Application Priority Data

May 13, 2016 (CN) .......................... 2016 1 0318879

(51) Int. Cl.
*G06F 17/00* (2019.01)
*G06F 3/0484* (2013.01)
(Continued)

(52) U.S. Cl.
CPC ........ *G06F 3/04842* (2013.01); *G06F 40/106* (2020.01); *G06F 40/117* (2020.01);
(Continued)

(58) Field of Classification Search
CPC .... G06F 40/169; G06F 40/166; G06F 40/117; G06F 40/106; G06F 3/04883; G06F 3/04842; G06F 16/957
See application file for complete search history.

(56) References Cited

U.S. PATENT DOCUMENTS 5,893,127 A * 4/1999 Tyan ..................... G06F 16/958
715/209
7,693,842 B2 * 4/2010 Hinckley ........... G06K 9/00436
707/770

(Continued)

FOREIGN PATENT DOCUMENTS

| CN | 1609846 A | 4/2005 |
| CN | 101968716 A | 2/2011 |

(Continued)

OTHER PUBLICATIONS

The CN1OA dated Jun. 26,2019 by the CNIPA.
(Continued)

*Primary Examiner* — Laurie A Ries
(74) *Attorney, Agent, or Firm* — Yunling Ren

(57) ABSTRACT

A system and method for processing a screenshot-type note of a streaming document. The system comprises: a gesture processing module (110) for recording screen coordinates of a selected region in a pre-set shape determined by a gesture in a current page of the streaming document; a note position calculation module (120) for receiving the screen coordinates of the selected region in the pre-set shape, and converting a screen coordinate of a pre-set position in the selected region into a relative position of a leaf node in the
(Continued)

streaming document; and a note information storage module (130) for storing the relative position of the leaf node and the screen coordinates of the selected region as note position information. The technical solution can improve the accuracy of a display position of a screenshot-type note in a streaming document.

20 Claims, 7 Drawing Sheets

(51) Int. Cl.
*G06F 40/106* (2020.01)
*G06F 40/117* (2020.01)
*G06F 40/166* (2020.01)
*G06F 40/169* (2020.01)
*G06F 3/0488* (2013.01)

(52) U.S. Cl.
CPC .......... *G06F 40/166* (2020.01); *G06F 40/169* (2020.01); *G06F 3/04883* (2013.01)

(56) References Cited

U.S. PATENT DOCUMENTS

| | | | | |
|---|---|---|---|---|
| 8,352,855 | B2* | 1/2013 | Levy | G06F 40/163 |
| | | | | 715/243 |
| 9,268,423 | B2* | 2/2016 | Stone | G06F 3/0488 |
| 2004/0252888 | A1* | 12/2004 | Bargeron | G06F 40/171 |
| | | | | 382/188 |
| 2007/0214407 | A1 | 9/2007 | Bargeron et al. | |
| 2008/0033996 | A1* | 2/2008 | Kesari | G06F 40/14 |
| 2008/0088628 | A1* | 4/2008 | Lu | G06T 11/206 |
| | | | | 345/440 |
| 2010/0194766 | A1* | 8/2010 | Nakagawa | G06T 17/005 |
| | | | | 345/543 |
| 2012/0297364 | A1* | 11/2012 | Wehrwein | G06F 11/3664 |
| | | | | 717/123 |
| 2013/0007875 | A1* | 1/2013 | Jakobsson | G06F 3/0486 |
| | | | | 726/19 |
| 2013/0204867 | A1* | 8/2013 | Lim | G06F 40/258 |
| | | | | 707/723 |
| 2013/0204897 | A1* | 8/2013 | McDougall | G06F 3/04842 |
| | | | | 707/780 |
| 2013/0212498 | A1* | 8/2013 | Lim | G06F 16/9577 |
| | | | | 715/760 |
| 2013/0283147 | A1* | 10/2013 | Wong | G06Q 10/10 |
| | | | | 715/234 |
| 2014/0164900 | A1* | 6/2014 | Zeng | G06F 40/169 |
| | | | | 715/230 |
| 2014/0337775 | A1* | 11/2014 | Northrup | G06F 8/34 |
| | | | | 715/770 |
| 2015/0347478 | A1* | 12/2015 | Tripathi | G06F 16/29 |
| | | | | 707/743 |
| 2016/0077713 | A1* | 3/2016 | Zuo | G06F 3/0488 |
| 2016/0125181 | A1* | 5/2016 | Dai Zovi | G06F 3/0236 |
| | | | | 726/19 |
| 2016/0217114 | A1* | 7/2016 | Fan | G06F 40/166 |
| 2016/0313883 | A1* | 10/2016 | Zhang | G06F 3/04842 |
| 2017/0212658 | A1* | 7/2017 | Shimizu | G09G 5/14 |
| 2017/0251072 | A1* | 8/2017 | Rinehart | H04L 67/2804 |
| 2018/0067954 | A1* | 3/2018 | Wang | G06F 16/9558 |
| 2019/0243601 | A1* | 8/2019 | Liu | G06F 3/04883 |

FOREIGN PATENT DOCUMENTS

| | | |
|---|---|---|
| CN | 102457613 A | 5/2012 |
| CN | 102637193 A | 8/2012 |
| CN | 102662525 A | 9/2012 |
| CN | 102760170 A | 10/2012 |
| CN | 103092822 A | 5/2013 |
| CN | 104516919 A | 4/2015 |
| CN | 104777981 A | 7/2015 |
| CN | 104866306 A | 8/2015 |
| CN | 105095432 A | 11/2015 |
| CN | 105302464 A | 2/2016 |
| RU | 2013137430 A | 2/2015 |

OTHER PUBLICATIONS

International Search Report for International Application No. PCT/CN2017/080184, dated Jun. 29, 2017.
The RUNOA dated Jun. 15,2020 by the RU Office.

* cited by examiner

Originally, these hates are all in the world, not on the Internet, but aren't they said before? The media is the extension of human beings. Therefore, we have also seen the unsatisfactory people in the peace and prosperity of the people in the peace and prosperity of the world!

Presumably, the world is still not good, it is unbearable, there are misfortunes, there are dissatisfaction, and there are injustices. Therefore, various emotions have been extended, and various people have been extended.

I mean, I am not alone.
I mean you, you have been extended.
I also said him, he was also extended.
I mean them, they are extended as well.
I mean the world, this world has been extended by life.

Originally, these hates are all in the world, not on the Internet, but aren't they said before? The media is the extension of human beings. Therefore, we have also seen the unsatisfactory people in the peace and prosperity of the people in the peace and prosperity of the world!

Presumably, the world is still not good, it is unbearable, there are misfortunes, there are dissatisfaction, and there are injustices. Therefore, various emotions have been extended, and various people have been extended.

COPY | UNDERLINE | NOTE | ...

I mean, I am not alone.
I mean you, you have been extended.
I also said him, he was also extended.
I mean them, they are extended as well.
I mean the world, this world has been extended by life.

Originally, these hates are all in the world, not on the Internet, but aren't they said before? The media is the extension of human beings. Therefore, we have also seen the unsatisfactory people in the peace and prosperity of the people in the peace and prosperity of the world!

Presumably, the world is still not good, it is unbearable, there are misfortunes, there are dissatisfaction, and there are injustices. Therefore, various emotions have been extended, and various people have been extended.

<u>I mean, I am not alone.</u>
I mean you, you have been extended.
I also said him, he was also extended.
I mean them, they are extended as well.
I mean the world, this world has been extended by life.

Long Press to Select Text

Complete Note Displaying Effect

Fig. 4

Originally, these hates are all in the world, not on the Internet, but aren't they said before? The media is the extension of human beings. Therefore, we have also seen the unsatisfactory people in the peace and prosperity of the people in the peace and prosperity of the world!

Presumably, the world is still not good, it is unbearable, there are misfortunes, there are dissatisfaction, and there are injustices. Therefore, various emotions have been extended, and various people have been extended.

¶ I mean, I am not alone.
I mean you, you have been extended.
I also said him, he was also extended.
I mean them, they are extended as well.
I mean the world, this world has been extended by life.

.... Clicking Air Bubble ...▶

Originally, these hates are all in the world, not on the Internet, but aren't they said before? The media is the extension of human beings. Therefore, we have also seen the unsatisfactory people in the peace and prosperity of the people in the peace and prosperity of the world!

Presumably, the world is still not good, it is unbearable, there are misfortunes, there are dissatisfaction, and there are injustices. Therefore, various emotions have been extended, and various people have been extended.

¶ ... ne.
I m  Note  e been extended.
I als       as also extended.
I mean them, they are extended as well.
I mean the world, this world has been extended by life.

Fig. 7

Turn back now, how much hates are there in the world? Originally, these hates are all in the world, not on the Internet, but aren't they said before? The media is the extension of human beings. Therefore, we have also seen the unsatisfactory people in the peace and prosperity of the people in the peace and prosperity of the world!

Presumably, the world is still not good, it is unbearable, there are misfortunes, there are dissatisfaction, and there are injustices. Therefore, various emotions have been extended, and various people have been extended.

¶ I mean, I am not alone.
I mean you, you have been extended.
I also said him, he was also extended.
I mean them, they are extended as well.
I mean the world, this world has been extended by life.
However, you don't know, he doesn't know, they don't know, and the world doesn't know, either.

.... Clicking Air Bubble ...▶

Turn back now, how much hates are there in the world? Originally, these hates are all in the world, not on the Internet, but aren't they said before? The media is the extension of human beings. Therefore, we have also seen the unsatisfactory people in the peace and prosperity of the people in the peace and prosperity of the world!

Presumably, the world is still not good, it is unbearable, there are misfortunes, there are dissatisfaction, and there are injustices. Therefore, various emotions have been extended, and various people have been extended.

¶ ... ne.
I m  Note  e been extended.
I als       as also extended.
I mean them, they are extended as well.
I mean the world, this world has been extended by life.
However, you don't know, he doesn't know, they don't know, and the world doesn't know, either.

Fig. 8

SYSTEM AND METHOD FOR PROCESSING SCREENSHOT-TYPE NOTE OF STREAMING DOCUMENT

This application is based upon and claims priority to Chinese Patent Application No. CN201610318879.3, titled "SYSTEM AND METHOD FOR PROCESSING SCREENSHOT-TYPE NOTE OF STREAMING DOCUMENT", filed on May 13, 2016.

TECHNICAL FIELD

The present disclosure relates to the technical field of computer, and in particular, to a system and a method for processing a screenshot-type note of a streaming document.

BACKGROUND

The technique of storing and displaying a screenshot-type note in a fixed-layout document is to store a page number and in-page screen coordinates corresponding to a screenshot, and to display the screenshot-type note at the corresponding position.

When a screenshot is stored, absolute coordinates of the screenshot (a page number and in-page screen coordinates) of the screenshot in the fixed-layout document are sent back to a server, and stored in an entry corresponding to the note in a database. When the document is loaded, a port of the server is called, and absolute coordinates of all of the screenshot-type notes within the document are sent back. When a page of the fixed-layout document is rendered, the notes are displayed at the corresponding positions.

However, the storage technique of a screenshot-type note in a fixed-layout document is not suitable for a streaming document. That is because the streaming document may be re-formatted when being displayed, and in this case, the page numbers and the screen coordinates will change and the stored positions of the notes will be lost.

Therefore, there is a demand for a novel system and a method for processing a screenshot-type note for a streaming document.

The above information disclosed in this Background section is only for enhancement of understanding of the background of the present disclosure, and thus it may include information that does not constitute prior art known to those of ordinary skill in the art.

SUMMARY

The present disclosure provides a system and method for processing a screenshot-type note of a streaming document, which can improve the efficiency for the user in reading and searching for comments made in an electronic book.

Other features and advantages of the present disclosure will be apparent from the following detailed description.

According to one aspect of the present disclosure, there is provided a system for processing a screenshot-type note of a streaming document, including: a gesture processing module configured to record screen coordinates of a selected area of a preset shape determined by a gesture in a current page of the streaming document; a note position calculation module configured to receive the screen coordinates of the selected area of the preset shape, and convert the screen coordinates of a preset position in the selected area to a relative position of a leaf node in the streaming document; and a note information storage module configured to store the relative position of the leaf node and the screen coordinates of the selected area as position information of the note.

In an embodiment of the present disclosure, the preset shape is a quadrilateral, and the screen coordinates of the selected area are screen coordinates of four points of an upper left corner, an upper right corner, a lower left corner, and a lower right corner of the quadrilateral.

In an embodiment of the present disclosure, the preset position is screen coordinates of the upper left corner of the selected area.

In an embodiment of the present disclosure, the note position calculation module includes: a leaf node matching unit configured to calculate a distance between the screen coordinates of the upper left corner and a leaf node in the current page of the streaming document, and take the leaf node with a minimum distance as a leaf node corresponding to the current screenshot-type note; a deciding unit configured to determine whether the corresponding leaf node is a text node; and a note position determining unit configured to: when the leaf node is a non-text node, take the node number corresponding to the leaf node as a relative position of the leaf node; when the leaf node is a text node, take the node number corresponding to the leaf node and a relative position of a character in the leaf node with the minimum distance to the screen coordinates of the upper left corner as the relative position of the leaf node.

In an embodiment of the present disclosure, the note position determining unit includes: a row position calculation subunit configured to determine, according to a longitudinal distance between the screen coordinates of the upper left corner and a top of the leaf node and a line height of each row of the leaf node, a row position of the screen coordinates of the upper left corner in the leaf node; and a column position calculation subunit configured to determine, according to a lateral distance between the screen coordinates of the upper left corner and a leftmost of the leaf node and a horizontal width of each character of the leaf node, a character of the leaf node corresponding to the screen coordinates of the upper left corner.

In an embodiment of the present disclosure, the note position determining unit further includes: a relative position calculation subunit configured to calculate a distance between the corresponding character and a first character of the leaf node, and take the distance as the relative position of the character in the leaf node.

In an embodiment of the present disclosure, the system further includes: a note input module configured to receive note content input by the user in the selected area, and input the note content to the note information storage module; wherein the note information storage module is configured to store the note position and the note content in association.

In an embodiment of the present disclosure, the system further includes: a note information display module configured to display the note content at the note position.

According to another aspect of the present disclosure, there is also provided a method for processing a screenshot-type note of a streaming document, including: recording screen coordinates of a selected area of a preset shape determined by a gesture in a current page of the streaming document; receiving the screen coordinates of the selected area of the preset shape, and converting the screen coordinates of a preset position in the selected area to a relative position of a leaf node in the streaming document; and storing the relative position of the leaf node and the screen coordinates of the selected area as position information of the note.

In an embodiment of the present disclosure, the preset shape is a quadrilateral, and the screen coordinates of the selected area are screen coordinates of four points of an upper left corner, an upper right corner, a lower left corner, and a lower right corner of the quadrilateral.

In an embodiment of the present disclosure, the preset position is screen coordinates of the upper left corner of the selected area.

In an embodiment of the present disclosure, converting the screen coordinates of a preset position in the selected area to a relative position of a leaf node in the streaming document includes: calculating a distance between the screen coordinates of the upper left corner and a leaf node in the current page of the streaming document, and taking the leaf node with a minimum distance as a leaf node corresponding to the current screenshot-type note; determining whether the corresponding leaf node is a text node; when the leaf node is a non-text node, taking the node number corresponding to the leaf node as a relative position of the leaf node; and when the leaf node is a text node, take the node number corresponding to the leaf node and a relative position of a character in the leaf node with the minimum distance to the screen coordinates of the upper left corner as the relative position of the leaf node.

In an embodiment of the present disclosure, taking the node number of the leaf node corresponding to the screen coordinates of the upper left corner and a relative position of a corresponding character in the leaf node as the note position includes: determining, according to a longitudinal distance between the screen coordinates of the upper left corner and a top of the leaf node and a line height of each row of the leaf node, a row position of the screen coordinates of the upper left corner in the leaf node; determining, according to a lateral distance between the screen coordinates of the upper left corner and a leftmost of the leaf node and a horizontal width of each character of the leaf node, a character of the leaf node corresponding to the screen coordinates of the upper left corner; and calculating a distance between the corresponding character and a first character of the leaf node, and take the distance as the relative position of the character in the leaf node.

In an embodiment of the present disclosure, the method further includes: receiving note content input by the user in the selected area; and storing the note position and the note content in association at a server.

In an embodiment of the present disclosure, the method further includes: sending, to the server, a request for returning all the note positions under the streaming document; when rendering a next page of the streaming document, in case where the page has a note, displaying a preset marker at a preset point of the corresponding not position; when receiving a click from the user on the preset marker, sending a request for returning corresponding note content to the server; and after receiving the note content returned from the server, displaying the note content at the note position of the streaming document in a predetermined form.

In the system and the method for processing a screenshot-type note of a streaming document disclosed in some embodiments of the present disclosure, by storing a relative position of a screenshot-type note in a streaming document, it can improve the accuracy of the displaying position of the screenshot-type note in the streaming document, and it can improve the user experience.

The above general description and the following detailed description are intended to be illustrative and not restrictive.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 4 is a schematic diagram of a note displayed based on the system of FIG. 3;

FIG. 7 is a schematic diagram showing a screenshot-type note displayed when a streaming document is not re-formatted based on the method of FIG. 6; and FIG. 8 is a schematic diagram showing a screenshot-type note displayed after a streaming document is re-formatted based on the method of FIG. 6.

DETAILED DESCRIPTION

Figure 1:
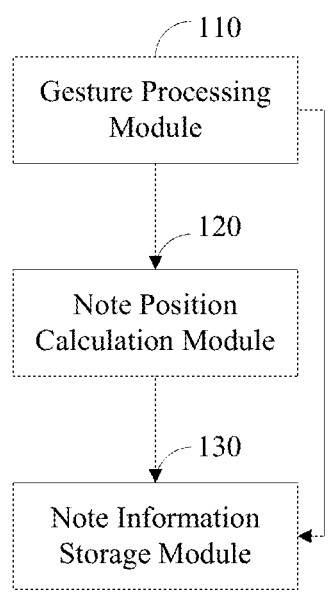
FIG. 1 is a block diagram illustrating a system for processing a screenshot-type note of a streaming document according to an exemplary embodiment of the present disclosure.

Exemplary embodiments will now be described more fully with reference to the accompanying drawings. However, the exemplary embodiments can be embodied in a variety of forms and should not be construed as being limited to the embodiments set forth herein. Rather, these embodiments are provided to make the present disclosure more complete and thorough, and to fully convey the concept of the exemplary embodiments to those skilled in the art. The drawings are only schematic illustration of the disclosure, and are not necessarily drawn to scale. The same reference numerals in the drawings denote the same or similar structures, and thus their detailed description will be omitted.

The features, structures, or characteristics described above may be combined in any suitable manner in one or more embodiments. In the description below, numerous specific details are set forth to provide a thorough understanding to the embodiments of the present disclosure. However, one skilled in the art will appreciate that the technical solution of the present disclosure may be practiced without one or more of the specific details, or other methods, components, systems, steps and the like may be employed. In other instances, well-known structures, methods, systems, implementations, materials or operations are not shown or described in detail to avoid obscuring aspects of the present disclosure.

Some of the block diagrams shown in the figures are functional entities and do not necessarily have to correspond to physically or logically separate entities. These functional entities may be implemented in software, or implemented in one or more hardware modules or integrated circuits, or implemented in different network and/or processor systems and/or microcontroller systems.

The embodiments described in the following exemplary embodiments do not represent all embodiments consistent with the present disclosure. Instead, they are merely examples of systems and methods consistent with aspects of the present disclosure as detailed in the appended claims.

FIG. 1 is a block diagram illustrating a system for processing a screenshot-type note of a streaming document according to an exemplary embodiment of the present disclosure.

As shown in FIG. 1, the system includes: a gesture processing module 110, configured to record screen coordinates of a selected area of a preset shape determined by a gesture in a current page of a streaming document; a note position calculation module 120, configured to receive the screen coordinates of the selected area of the preset shape, and convert the screen coordinates of a preset position in the selected area to a relative position of a leaf node in the streaming document; a note information storage module 130 configured to store the relative position of the leaf node and the screen coordinates of the selected area as position information of the note. The gesture processing module 110 is connected to the note position calculation module 120 and the note information storage module 130 respectively, for inputting the screen coordinates of the selected area captured by the gesture processing module 110 to the note position calculation module 120 and the note information storage module 130 respectively. The note position calculation module 120 is connected to the note information storage module 130.

At present, mobile reading applications generally support the storage and display of a text-type note in streaming documents, including: a scribing line, a note, and the like. The storage method of a text-type note captures a position where a finger long press event and a sliding event occurs, correspond the position with a leaf node to a currently displayed streaming document, and stores the number of the corresponding leaf node and the relative position of the corresponding character in the leaf node as a parameter in an entry of the corresponding note stored in a database.

However, while the number of the leaf node and the relative position of the character in the node can be recorded for the text-type note, a non text-type node cannot be recognized, and a non text-type node refers to a node that does not contain a character, for example a picture node, an audio node, a video node, a FLASH node, and the like. The screenshot-type note is supported by non-text nodes. However, the screenshot-type note cannot directly obtain the node numbers and the relative positions of the characters of the streaming document.

The streaming document refers to a document containing texts, numbers, tables and graphic images that have been processed in a specific formatting manner. The stored content refers to original editing elements. The user can view the edited layout through reading software, and the document may be displayed in a scale automatically adapted to the size of the screen. When displayed on a small sized screen through an e-book reader, it is desirable to zoom in and then re-arrange the original layout, and to adjust the line breaks of the paragraphs according to the width of the screen, so as to adapt to the field of view of the single page.

The streaming document has a variety of leaf nodes, including: a text paragraph, a picture, a link, an audio control and a video. The link, span, div, p, and so on can be converted into text paragraphs, which can be taken as text nodes in the present disclosure. Therefore, a line scribing function is triggered when a scribing gesture appears in a text paragraph or a link.

The major difference of a fixed-layout document from a streaming layout is that the layout is fixed. During the reading process, the document is constantly displayed in the original layout. After scaling, the layout is not automatically re-formatted according to the page width, such as a PDF file made from the original picture manuscript obtained by scanning.

In an exemplary embodiment, the preset shape is a quadrilateral, and screen coordinates of the selected area are screen coordinates of four points of an upper left corner, an upper right corner, a lower left corner, and a lower right corner of the quadrilateral.

In an exemplary embodiment, the preset position is screen coordinates of the upper left corner of the selected area.

In an exemplary embodiment, the note position calculation module 120 includes: a leaf node matching unit configured to calculate a distance between screen coordinates of the upper left corner and a leaf node in a current page of the streaming document, and take the leaf node with the minimum distance as the leaf node corresponding to the current screenshot-type note; a deciding unit configured to determine whether the corresponding leaf node is a text node; and a note position determining unit configured to: when the leaf node is a non-text node, take the node number corresponding to the leaf node as a relative position of the leaf node; when the leaf node is a text node, take the node number corresponding to the leaf node and a relative position of a character in the leaf node with the minimum distance to the screen coordinates of the upper left corner as the relative position of the leaf node.

In an exemplary embodiment, the note position determining unit includes: a row position calculation subunit configured to determine, according to a longitudinal distance between the screen coordinates of the upper left corner and a top of the leaf node and a line height of each row of the leaf node, a row position of the screen coordinates of the upper left corner in the leaf node; and a column position calculation subunit configured to determine, according to a lateral distance between the screen coordinates of the upper left corner and a leftmost of the leaf node and a horizontal width of each character of the leaf node, a character of the leaf node corresponding to the screen coordinates of the upper left corner.

In an exemplary embodiment, the note position determining unit further includes: a relative position calculation subunit configured to calculate a distance between the corresponding character and a first character of the leaf node, and take the distance as the relative position of the character in the leaf node.

Figure 2:
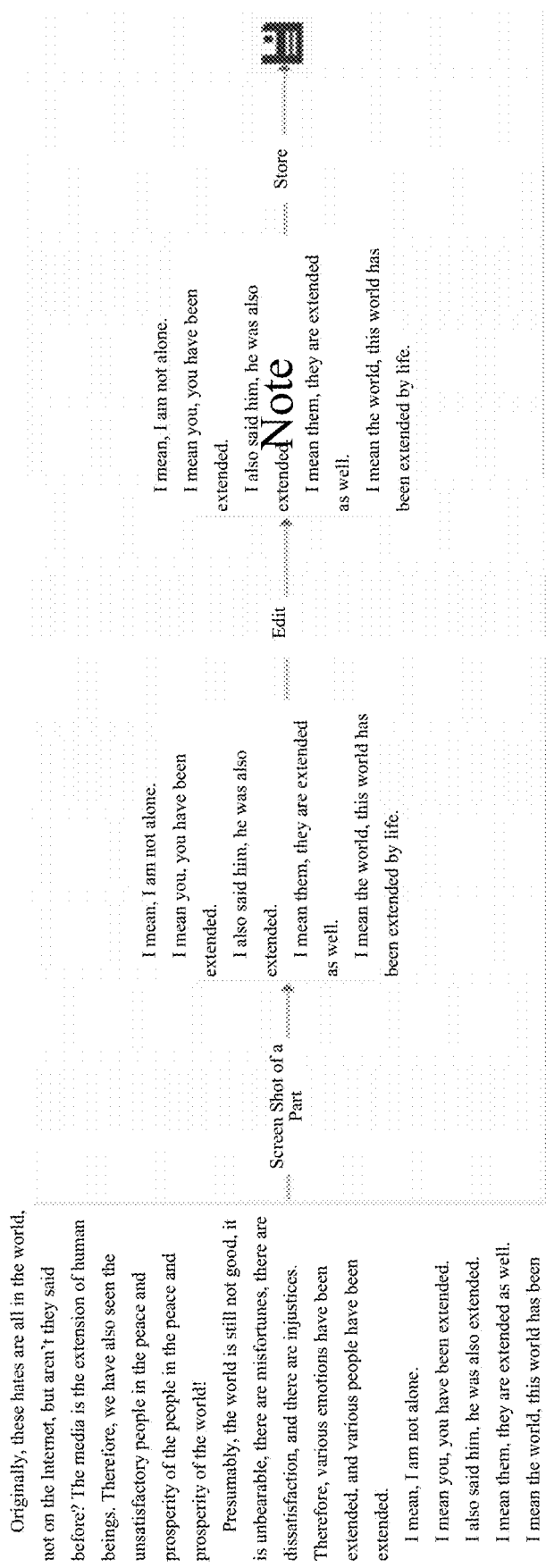
FIG. 2 is a schematic diagram showing a screenshot-type note of a streaming document based on the system of FIG. 1.

FIG. 2 is a schematic diagram showing a screenshot-type note of a streaming document based on the system of FIG. 1.

A page in the mobile reading application is screenshot in a form of a picture, and after editing, the picture is stored as a screenshot-type note, as shown in FIG. 2.

Figure 3:
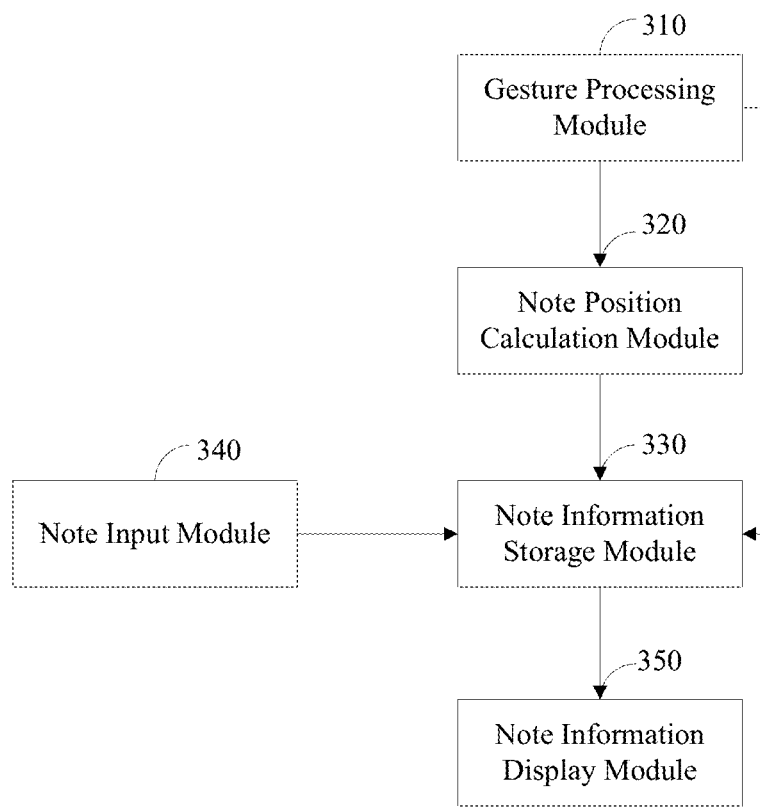
FIG. 3 is a block diagram illustrating a system for processing a screenshot-type note of a streaming document, according to an exemplary embodiment of the present disclosure.

FIG. 3 is a block diagram illustrating a system for processing a screenshot-type note of a streaming document, according to an exemplary embodiment of the present disclosure.

As shown in FIG. 3, the system includes: a gesture processing module 310, configured to record screen coordinates of a selected area of a preset shape determined by a gesture in a current page of a streaming document; a note position calculation module 320, configured to receive the screen coordinates of the selected area of the preset shape, and convert the screen coordinates of a preset position in the selected area to a relative position of a leaf node in the streaming document; a note information storage module 330 configured to store the relative position of the leaf node and the screen coordinates of the selected area as position information of the note.

In an exemplary embodiment, the system further includes a note input module 340, configured to receive note content input by the user in the selected area, and input the note content to the note information storage module. The note information storage module is configured to store the note position and the note content in association.

In an exemplary embodiment, the system further includes a note information display module 350 configured to display the note content at the note position.

The system of the embodiment of the present disclosure may include two parts: a client and a server. The client includes the gesture processing module 310, the note position calculation module 320, the note input module 340, and the note information display module 350. The server includes the note information storage module 330. It should be noted that the division of the modules included in the client and the server is not for limiting the disclosure, but is merely an exemplary illustration. For example, the gesture processing module 310, the note position calculation module 320, and the note information storage module 350 may all be disposed at the server.

The gesture processing module 310 is configured to process a gesture event generated when the user makes a screenshot-type note, and records the screen coordinates of the selected area to be sent to the note position calculation module 320. The note position calculation module 320 is configured to convert the screen coordinates of the selected area into a relative position of the screenshot-type note in the streaming document.

For example, in the case of a non-text node, the node number is selected as the note position; and in the case of a text node, the node number and a relative position of a character in the leaf node with the minimum distance to the screen coordinates of the upper left corner of the selected area as the note position.

The note input module 340 is in communication with the note information storage module 330 at the server to transmit note content and note position information to the server. The note information display module 350 is in communication with the note information storage module 330 at the server, to send a note display request, and display the returned note content and the note position on the corresponding position of the streaming document.

The note information storage module 330 at the server is configured to store in association the note content and the note position transmitted from the client, and respond to the note display request sent by the client.

Other description in the embodiment of the present disclosure may refer to the description in the foregoing embodiment, details of which will not be repeated herein.

FIG. 4 schematically shows a schematic diagram of a note display based on the system of FIG. 3.

For displaying, the client needs to invoke a server interface. When loading the streaming document, the client first retrieves the positions of all the notes in the current document, and when rendering and laying out the current streaming document, the client displays scribing lines at the positions of the corresponding characters in the corresponding nodes, as shown in FIG. 4.

Figure 5:
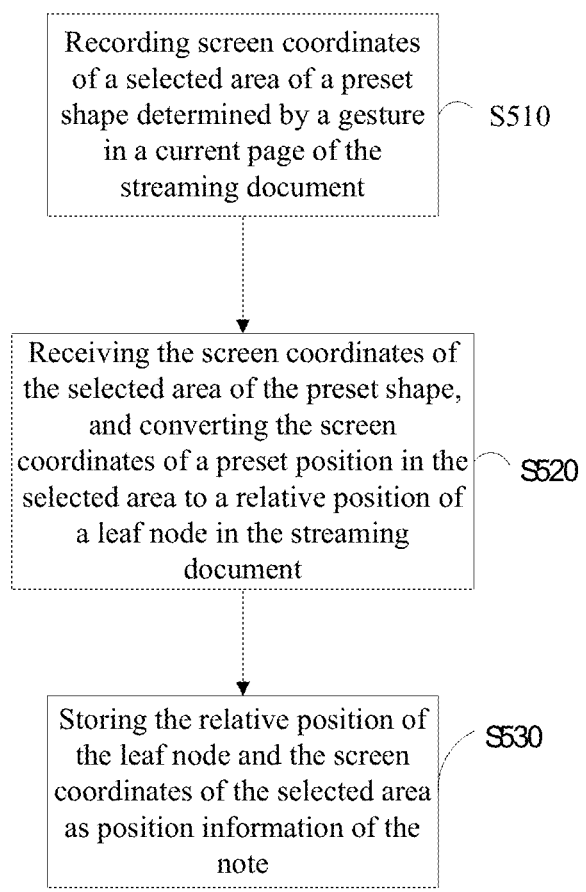
FIG. 5 is a flowchart illustrating a method for processing a screenshot-type note of a streaming document according to an exemplary embodiment of the present disclosure.

FIG. 5 is a flowchart illustrating a method for processing a screenshot-type note of a streaming document according to an exemplary embodiment of the present disclosure.

As shown in FIG. 5, in step S510, screen coordinates of a selected area of a preset shape determined by a gesture in a current page of a streaming document are recorded.

In an exemplary embodiment, the preset shape is a quadrilateral, and screen coordinates of the selected area are screen coordinates of four points of an upper left corner, an upper right corner, a lower left corner, and a lower right corner of the quadrilateral.

In step S520, the screen coordinates of the selected area of the preset shape are received, and the screen coordinates of a preset position in the selected area are converted to a relative position of a leaf node in the streaming document.

In an exemplary embodiment, the preset position is screen coordinates of the upper left corner of the selected area.

In an exemplary embodiment, converting the screen coordinates of a preset position in the selected area to a relative position of a leaf node in the streaming document includes: calculating a distance between the screen coordinates of the upper left corner and a leaf node in a current page of the streaming document, and taking the leaf node with the minimum distance as the leaf node corresponding to the current screenshot-type note; determining whether the corresponding leaf node is a text node; and when the leaf node is a non-text node, taking the node number corresponding to the leaf node as a relative position of the leaf node; when the leaf node is a text node, taking the node number corresponding to the leaf node and a relative position of a character in the leaf node with the minimum distance to the screen coordinates of the upper left corner as the relative position of the leaf node.

In an exemplary embodiment, taking the node number of the leaf node corresponding to the screen coordinates of the upper left corner and a relative position of a corresponding character in the leaf node as the note position includes: determining, according to a longitudinal distance between the screen coordinates of the upper left corner and a top of the leaf node and a line height of each row of the leaf node, a row position of the screen coordinates of the upper left corner in the leaf node; determining, according to a lateral distance between the screen coordinates of the upper left corner and a leftmost of the leaf node and a horizontal width of each character of the leaf node, a character of the leaf node corresponding to the screen coordinates of the upper left corner; and calculating a distance between the corresponding character and a first character of the leaf node, and take the distance as the relative position of the character in the leaf node.

In step S530, the relative position of the leaf node and the screen coordinates of the selected area are stored as position information of the note.

In an exemplary embodiment, the method further includes: receiving note content input by the user in the selected area, and storing the note position and the note content in association at the server.

In an exemplary embodiment, the method further includes: sending, to the server, a request for returning all the note positions under the streaming document; when rendering a next page of the streaming document, if the page has a note, displaying a preset marker at a preset point of the corresponding not position; when receiving a click from the user on the preset marker, sending a request for returning corresponding note content to the server; and after receiving the note content returned from the server, displaying the note content at the note position of the streaming document in a predetermined form.

Other description in the embodiment of the present disclosure may refer to the description in the foregoing embodiment, details of which will not be repeated herein.

Figure 6:
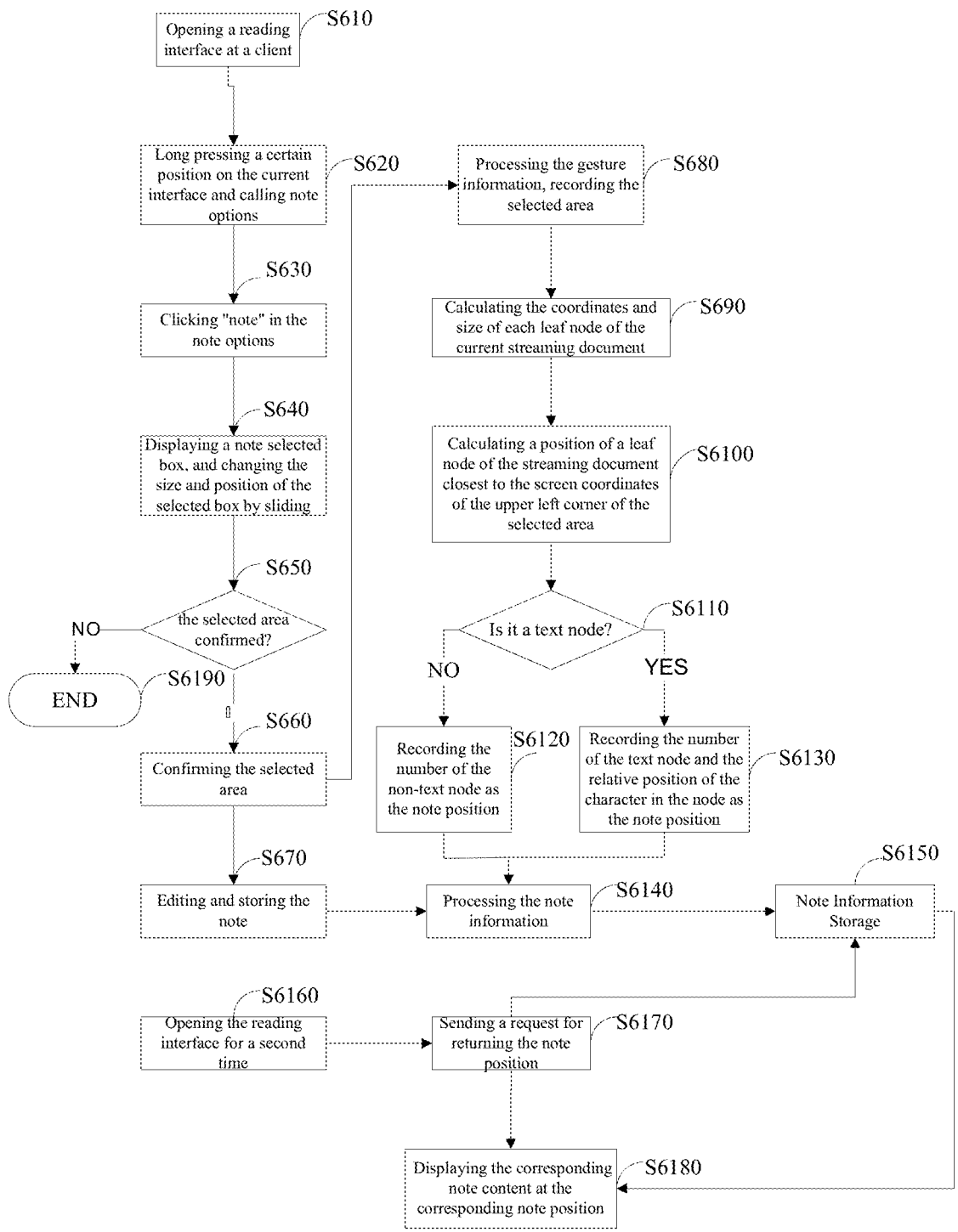
FIG. 6 is a flowchart illustrating a method for processing a screenshot-type note of a streaming document according to an exemplary embodiment of the present disclosure.

FIG. 6 is a flowchart illustrating a method for processing a screenshot-type note of a streaming document according to an exemplary embodiment of the present disclosure.

As shown in FIG. 6, in step S610, a user opens a reading interface at a terminal of the client for a streaming document.

In step S620, when the client detects that a certain position on the current interface of the streaming document is long pressed by the user with a finger or a stylus or the like, note options are called.

The gesture processing module at the client monitors a finger long press event, and when a finger long press event occurs, the note operation interface is called.

For example, a floating layer appears on the current interface of the streaming document, wherein the note options may include items such as "copy", "scribing", "note" and the like that are selectable by the user.

In step S630, "note" in the note options is clicked.

When the client detects that the user clicks on the "comments" option in the note options above, the process proceeds to the next step.

In step S640, a note selected box is displayed, and the size and position of the selected box are changeable by sliding.

The note selected box may be displayed on the current page of the streaming document, for example, the note selected box is a rectangle in shape. The user may drag the four corners or any of the four corners or any side of the rectangle to change the size and position of the selected box.

In step S650, it is determined whether the selected area is confirmed.

The gesture processing module at the client monitors a finger movement event, and when the finger stops moving and clicks an OK button, a prompting message is popped out to prompt confirmation on the selected area.

When the client detects that the user stops sliding the selected box, a prompt box is displayed on the current page of the streaming document for prompting the user to confirm the currently selected area, and the user may click the "OK" button or the "Cancel" button.

When the user clicks the "OK" button, the process proceeds to the next step; otherwise, when the user clicks the "Cancel" button, the process goes to step S6190.

In step S660, the selected area is confirmed.

The client confirms the current user selected area, and takes the text content in the selected box the streaming document as the original text corresponding to the screenshot-type note.

In step S670, the note is edited and stored.

After confirming the current user selected area, a note editing interface is entered, a note input module is presented in the corresponding position of the streaming document corresponding to the screenshot-type note, and the user may edit and store the note content of the original text corresponding to the screenshot-type note. After the process of adding a note at the foreground is finished, the stored note content and other information may be sent to the note information storage module 330 at the background.

In step S680, the gesture information is processed and the selected area is recorded.

While the user inputs the note content, the client processes the gesture information of the user, and records the screen coordinates of the selected area, such as screen coordinates of the upper left corner, the upper right corner, the lower left corner, and the lower right corner of the rectangle, or a rectangular rectangle. Alternatively, the screen coordinates of the upper left corner of the rectangle and the length and width of the sides of box are recorded, which is not limited in this disclosure, as long as the recorded information is sufficient to determine the position of the sides of the box.

The screen coordinate information of the four corners (the upper left corner, the upper right corner, the lower left corner, and the lower right corner) of the selected area as confirmed are recorded and returned to the note position calculation module at the client.

In step S690, the coordinates and size of each leaf node of the current streaming document are calculated.

The note position calculation module at the client repeatedly calculates the coordinates and size of each leaf node (such as the number of each leaf node, the line height of the text node in the leaf node and the horizontal width of a character corresponding to the leaf node, the number of rows in the previous page of a leaf node spanning across pages, the number of rows in the current page, etc.) of the current streaming document while the user opens the streaming document or when it is firstly detected that the user intends to make a screenshot-type note on the current streaming document. For calculation of a text node, the leaf nodes are divided based on paragraphs, one paragraph corresponding to one leaf node. For example, the end of the paragraph may be determined based on the carriage return character at the end of the paragraph.

In step S6100, a position of a leaf node of the streaming document closest to the screen coordinates of the upper left corner of the selected area is calculated.

The screen coordinates of the upper left corner of the selected area as confirmed, are matched to the coordinates of each leaf node of the streaming document, and coordinates of the leaf node with the minimum physical distance to the screen coordinates of the upper left corner of the selected area are determined. The leaf node at the screen coordinates of the upper left corner of the selected area with the minimum physical distance refers to the leaf node with the minimum physical linear distance to the screen coordinates of the upper left corner of the selected area or the leaf node with the minimum lateral distance or the minimum longitudinal distance to the screen coordinates of the upper left corner of the selected area. In an exemplary embodiment, the leaf node with the minimum physical distance to the screen coordinates of the upper left corner herein includes leaf nodes inside or outside the selected area. In another exemplary embodiment, the leaf node with the minimum physical distance to the screen coordinates of the upper left corner herein includes leaf nodes inside the selected area.

It should be noted that, although the embodiment of the present disclosure is described by taking the screen coordinates of the upper left corner of the selected area as an example, the present disclosure does not limit this. For example, the leaf node of the streaming document with the minimum distance to the screen coordinates of the upper right corner of the selected area may be selected as the leaf node corresponding to the screenshot-type note.

In step S6110, it is determined whether the leaf node of the streaming document closest to the screen coordinates of the upper left corner of the selected area is a text node.

When the leaf node of the streaming document closest to the screen coordinates of the upper left corner of the selected area is a non-text node, the process proceeds to the next step; otherwise, the process goes to step S6130.

In step S6120, the number of the non-text node is recorded as the note position.

When the leaf node of the streaming document closest to the screen coordinates of the upper left corner of the selected area is a non-text node, the non-text node number of the corresponding leaf node of the streaming document is recorded as the note position.

If the leaf node is a non-text node, that is, a node that does not contain text, such as a picture node, an audio node, a video node, a FLASH node, etc., the node number of the leaf node is recorded as X, and the node number is sent to the note position calculation module at the client as the note position.

In step S6130, the number of the text node and the relative position of the character in the node are recorded as the note position.

When the leaf node of the streaming document closest to the screen coordinates of the upper left corner of the selected area is a text node, the text node number of the corresponding leaf node of the streaming document and the relative position of the character in the node are recorded as the note position.

If the leaf node is a text node, the following operations are performed.

(1) A line height of the corresponding leaf node is calculated, such as the line-height attribute of cascading style sheets (CSS). Generally, the line height is the same for the same text leaf node.

(2) A longitudinal distance between the screen coordinates of the upper left corner of the selected area and the top of the leaf node is calculated. If the distance is a negative value, the first row of the leaf node is recorded as the corresponding row of the screen coordinates of the upper left corner of the selected area. When the leaf node spans across pages, the row number is the practical row number. If the distance is a positive value, the distance is divided by the line height to obtain the row number of the leaf node where the screen coordinates of the upper left corner of the selected area is located. If the obtained row number is larger than the total row number of the leaf node, or is larger than the total row number of the leaf node in the current page, the last row or the last row in the current page of the leaf node is recorded as the corresponding row.

When the leaf node spans across pages, the row number is the actual row number means that, when the leaf node spans across pages, for example, the leaf node includes 2 rows in the previous page, and 3 rows in the current page, and the calculation of the above step (2) obtains that the screen coordinates of the upper left corner of the selected area corresponding the second row of the leaf node in the current page, at this time, the actual row number of the screen coordinates of the upper left corner of the selected area corresponding to the leaf node is the $4^{th}$ row, that is, further adding the two rows in the previous page.

(3) A horizontal width (CSS, 1em width) of a character in the corresponding leaf node is calculated.

A horizontal distance between the screen coordinates of the upper left corner of the selected area and a left side of the leaf node. If the distance is a negative value, the first character on the row is recorded as the character corresponding to the screen coordinates of the upper left corner of the selected area. If the distance is a positive value, the distance is divided by the horizontal width of a character, to obtain at which character in the row the screen coordinates of the upper left corner of the selected area is located. If the obtained number of characters is larger than the total number of the characters in the row, the last character in the row is recorded as the corresponding character.

(4) The row number and character number of the leaf node corresponding to the screen coordinates of the upper left corner of the selected area obtained through the above calculation is converted to a distance between the character and the first character of the current leaf node, recorded as Y.

In step S6140, the note information is processed.

The client receives the note content input by the user and the corresponding note position (X or X, Y), and associates the note content with the note position, and packages them into a data packet and sends a request for storing the note information to the server.

In step S6150, the note information is stored.

After receiving the request for storing the note information sent by the client, the server stores the note content and the corresponding note position in association.

At this point, the current note storage process ends. The following is a note displaying process.

In step S6160, the reading interface is opened for a second time.

The user opens again the reading interface at the client for the corresponding streaming document.

In step S6170, a request for returning the note position is sent.

The note information display module at the client invokes a server interface, and sends a request for returning note positions of all notes in the streaming document to the note information storage module at the server.

In step S6180, the corresponding note content is displayed at the corresponding note position.

After receiving the request sent by the client for returning note positions of all notes in the streaming document, the note information storage module at the server, in response to the request, returns the note positions of all the notes of the streaming document.

When the note information display module at the client renders the next page during the reading process, if there is a note for that page, a preset marker is displayed at the corresponding not position of the streaming document. For example, an air bubble is displayed at the upper left corner of the corresponding position (if it is a non-text leaf node, the position is the corresponding node X, and if it is a text leaf node, the position is the character corresponding to X, Y).

When the note information display module at the client detects that the user clicks on the air bubble, the server interface is invoked to send a request for the note content of the corresponding screenshot-type note to the note information storage module at the server.

When receiving the request, the note information storage module at the server returns the corresponding note content to the client.

After receiving the information returned by the server, the note information display module at the client may be displayed on the side of the streaming document in a form of a thumbnail, and the user may further click the thumbnail to enter the note display page, and the note content is displayed at the note position corresponding to the screenshot-type note.

In step S6190, the process ends.

When the user does not confirm the selected area, the operation is terminated.

The method in the embodiment of the present disclosure corresponds to the contents of the modules in the foregoing system embodiment, detail of which will not be repeated herein.

FIG. 7 is a schematic diagram showing a screenshot-type note displayed when a streaming document is not re-formatted based on the method of FIG. 6.

FIG. 8 is a schematic diagram showing a screenshot-type note displayed after a streaming document is re-formatted based on the method of FIG. 6.

The embodiment of the present disclosure further discloses a user terminal, including: a display configured to display a current page of the streaming document; an input device configured to receive a note position and note content information input by the user; and a communication device configured to send a request for storing the note position and the note content in association and a request for returning the note position and corresponding note content for displaying.

In an exemplary embodiment, the user terminal may be an e-book reader, a tablet computer, or other smart electronic device including a communication device, a processor, a storage device, a display, and an input device. The communication device, the storage device, the display, and the input device are respectively connected to the processor to be controlled by the processor.

The communication device can be a short-range communication module chip such as a near field communication (NFC) module, a radio frequency identification (RFID) module, or a Bluetooth module with a short-range communication function. Since the near field communication technology has the characteristics of simple configuration and easy connection, the near field communication module chip is taken as an example in the embodiment. The processor can be the main computing core in the user terminal, such as a central processing unit (CPU), an embedded controller (EC), or a digital signal processor (DSP), or a dedicated integrated chip (ASIC) designed to be dedicated to handle note-sharing job of e-books or a field programmable logic gate (FPGA) chip.

The storage device is configured to store e-books and user data edited by the user or from other electronic devices. The storage device may specifically be a non-volatile memory (NVM) chip such as a flash memory or a programmable read only memory. The display provides an interface for displaying an electronic page of the e-book and associated user data. The input device is configured for the user to operate to control the e-book and/or user data on the control interface. The display and the input device can be integrated into a touch screen with a touch panel.

Other description in the embodiment of the present disclosure may refer to the description in the foregoing embodiment, details of which will not be repeated herein.

FIGS. 5 and 6 are flowcharts respectively illustrating a method for processing a screenshot-type note of a streaming document according to an exemplary embodiment of the present disclosure. The method may be implemented, for example, on a system for processing a screenshot-type note of a streaming document as shown in FIG. 1 or 3, but the disclosure is not limited thereto. It is to be noted that FIGS. 5 and 6 are merely schematic illustrations of the processes included in the method according to an exemplary embodiment of the present disclosure, and are not intended to be limiting. It will be readily understood that the processes illustrated in FIGS. 5 and 6 do not indicate or limit the chronological order of these steps. In addition, it is also readily understood that these processes may be performed synchronously or asynchronously, for example, in multiple modules/processes/threads.

Through the description of the above embodiments, those skilled in the art will readily understand that the example embodiments described herein may be implemented by software or by software in combination with necessary hardware. Therefore, the technical solution according to the embodiment of the present disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, a server, a mobile terminal, or a network device, etc.) to perform a method in accordance with the embodiment of the present disclosure.

In the method and system for processing a screenshot-type note of a streaming document disclosed in the present disclosure, by recording the relative position of the screenshot-type note in a non-text node and/or a text node, it can improve the accuracy of the displaying position of the screenshot-type note in the streaming document and improve the user experience.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

The exemplary embodiments of the present disclosure have been specifically shown and described above. It will be appreciated that the present disclosure is not limited to the detailed structure, disposition and implementation that have been described herein. Rather, the present disclosure is intended to cover various modifications and equivalents within the spirit and scope of the appended claims.

What is claimed is:

1. A system for processing a screenshot-type note of a streaming document, comprising a client and a server, wherein:
    the client is configured to record screen coordinates of a selected area of a preset shape determined by a gesture in a current page of the streaming document;
    the client is configured to receive the screen coordinates of the selected area of the preset shape, and convert the screen coordinates of a preset position in the selected area to a relative position of a leaf node in the streaming document; and
    the client is configured to send the relative position of the leaf node and the screen coordinates of the selected area to the server and store the same as position information of the note.

2. The system according to claim 1, wherein the preset shape is a quadrilateral, and the screen coordinates of the selected area are screen coordinates of four points of an upper left corner, an upper right corner, a lower left corner, and a lower right corner of the quadrilateral.

3. The system according to claim 2, wherein the preset position is screen coordinates of the upper left corner of the selected area.

4. The system according to claim 3, wherein the client is further configured to:
    calculate a distance between the screen coordinates of the upper left corner and a leaf node in the current page of the streaming document, and take the leaf node with a minimum distance as a leaf node corresponding to the current screenshot-type note;

determine whether the corresponding leaf node is a text node; and when the leaf node is a non-text node, take the node number corresponding to the leaf node as a relative position of the leaf node; when the leaf node is a text node, take the node number corresponding to the leaf node and a relative position of a character in the leaf node with the minimum distance to the screen coordinates of the upper left corner as the relative position of the leaf node.

5. The system according to claim 4, wherein the client is further configured to:

determine, according to a longitudinal distance between the screen coordinates of the upper left corner and a top of the leaf node and a line height of each row of the leaf node, a row position of the screen coordinates of the upper left corner in the leaf node; and determine, according to a lateral distance between the screen coordinates of the upper left corner and a leftmost of the leaf node and a horizontal width of each character of the leaf node, a character of the leaf node corresponding to the screen coordinates of the upper left corner.

6. The system according to claim 5, wherein the client is further configured to:

calculate a distance between the corresponding character and a first character of the leaf node, and take the distance as the relative position of the character in the leaf node.

7. The system according to claim 1, wherein the client is further configured to:

receive note content input by the user in the selected area, and input the note content to the note information storage module;

send the note position and the note content to the server and store them in association at the server.

8. The system according to claim 7, the client is further configured to:

display the note content at the note position.

9. A method for processing a screenshot-type note of a streaming document, comprising:

recording, by a client, screen coordinates of a selected area of a preset shape determined by a gesture in a current page of the streaming document;

receiving, by the client, the screen coordinates of the selected area of the preset shape, and converting the screen coordinates of a preset position in the selected area to a relative position of a leaf node in the streaming document; and sending, by the client, the relative position of the leaf node and the screen coordinates of the selected area to the server and store the same as position information of the note at the server.

10. The method according to claim 9, wherein the preset shape is a quadrilateral, and the screen coordinates of the selected area are screen coordinates of four points of an upper left corner, an upper right corner, a lower left corner, and a lower right corner of the quadrilateral.

11. The method according to claim 10, wherein the preset position is screen coordinates of the upper left corner of the selected area.

12. The method according to claim 11, wherein converting the screen coordinates of a preset position in the selected area to a relative position of a leaf node in the streaming document comprises:

calculating, by the client, a distance between the screen coordinates of the upper left corner and a leaf node in the current page of the streaming document, and taking the leaf node with a minimum distance as a leaf node corresponding to the current screenshot-type note;

determining, by the client, whether the corresponding leaf node is a text node;

when the leaf node is a non-text node, taking, by the client, the node number corresponding to the leaf node as a relative position of the leaf node; and when the leaf node is a text node, taking, by the client, the node number corresponding to the leaf node and a relative position of a character in the leaf node with the minimum distance to the screen coordinates of the upper left corner as the relative position of the leaf node.

13. The method according to claim 12, wherein taking, by the client, the node number of the leaf node corresponding to the screen coordinates of the upper left corner and a relative position of a corresponding character in the leaf node as the note position comprises:

determining, by the client, according to a longitudinal distance between the screen coordinates of the upper left corner and a top of the leaf node and a line height of each row of the leaf node, a row position of the screen coordinates of the upper left corner in the leaf node;

determining, by the client, according to a lateral distance between the screen coordinates of the upper left corner and a leftmost of the leaf node and a horizontal width of each character of the leaf node, a character of the leaf node corresponding to the screen coordinates of the upper left corner; and calculating, by the client, a distance between the corresponding character and a first character of the leaf node, and take the distance as the relative position of the character in the leaf node.

14. The method according to claim 9, further comprising:

receiving, by the client, note content input by the user in the selected area; and sending, by the client, the note position and the note content to the server and storing them in association at the server.

15. The method according to claim 14, further comprising:

sending, by the client, a request for returning all the note positions under the streaming document to the server;

when rendering a next page of the streaming document, in case where the page has a note, displaying, by the client, a preset marker at a preset point of the corresponding note position;

when receiving a click from the user on the preset marker, sending, by the client, a request for returning corresponding note content to the server; and after receiving the note content returned from the server, displaying, by the client, the note content at the note position of the streaming document in a predetermined form.

16. A non-transitory computer-readable medium whose contents, when executed by a processor, cause the processor to perform a screenshot-type note of a streaming document processing method comprising:

recording screen coordinates of a selected area of a preset shape determined by a gesture in a current page of the streaming document;

receiving the screen coordinates of the selected area of the preset shape, and converting the screen coordinates of a preset position in the selected area to a relative position of a leaf node in the streaming document; and sending the relative position of the leaf node and the screen coordinates of the selected area to a server and storing them as position information of the note at the server.

17. The non-transitory computer-readable medium according to claim 16, wherein the preset shape is a quadrilateral, and the screen coordinates of the selected area are screen coordinates of four points of an upper left corner, an upper right corner, a lower left corner, and a lower right corner of the quadrilateral.

18. The non-transitory computer-readable medium according to claim 17, wherein the preset position is screen coordinates of the upper left corner of the selected area.

19. The non-transitory computer-readable medium according to claim 18, wherein converting the screen coordinates of a preset position in the selected area to a relative position of a leaf node in the streaming document comprises:
 calculating a distance between the screen coordinates of the upper left corner and a leaf node in the current page of the streaming document, and taking the leaf node with a minimum distance as a leaf node corresponding to the current screenshot-type note;
 determining whether the corresponding leaf node is a text node;
 when the leaf node is a non-text node, taking the node number corresponding to the leaf node as a relative position of the leaf node; and
 when the leaf node is a text node, taking the node number corresponding to the leaf node and a relative position of a character in the leaf node with the minimum distance to the screen coordinates of the upper left corner as the relative position of the leaf node.

20. The non-transitory computer-readable medium according to claim 19, wherein taking the node number of the leaf node corresponding to the screen coordinates of the upper left corner and a relative position of a corresponding character in the leaf node as the note position comprises:
 determining according to a longitudinal distance between the screen coordinates of the upper left corner and a top of the leaf node and a line height of each row of the leaf node, a row position of the screen coordinates of the upper left corner in the leaf node;
 determining according to a lateral distance between the screen coordinates of the upper left corner and a leftmost of the leaf node and a horizontal width of each character of the leaf node, a character of the leaf node corresponding to the screen coordinates of the upper left corner; and
 calculating a distance between the corresponding character and a first character of the leaf node, and take the distance as the relative position of the character in the leaf node.

* * * * *